US007193200B2

(12) United States Patent
Taghizadeh-Kaschani et al.

(10) Patent No.: US 7,193,200 B2
(45) Date of Patent: Mar. 20, 2007

(54) RECEIVER CIRCUIT FOR A PUSH-PULL TRANSMISSION METHOD

(75) Inventors: Karim-Thomas Taghizadeh-Kaschani, Poing (DE); Jose Maria Martinez, Munich (DE)

(73) Assignee: Infineon Techologies AG, Munich (DE)

( * ) Notice: Subject to any disclaimer, the term of this patent is extended or adjusted under 35 U.S.C. 154(b) by 103 days.

(21) Appl. No.: 11/083,050

(22) Filed: Mar. 17, 2005

(65) Prior Publication Data
US 2005/0211878 A1 Sep. 29, 2005

(30) Foreign Application Priority Data
Mar. 17, 2004 (DE) .................. 10 2004 013 093

(51) Int. Cl.
*H04B 1/00* (2006.01)
(52) U.S. Cl. ..................... 250/210; 455/130
(58) Field of Classification Search ............ 369/53.23, 369/53.16; 398/188; 455/130; 250/210
See application file for complete search history.

(56) References Cited

U.S. PATENT DOCUMENTS

2004/0102164 A1* 5/2004 Taghizadeh-Kaschani .. 455/130

FOREIGN PATENT DOCUMENTS

| DE | 198 31 921 A1 | 1/2000 |
|----|---------------|--------|
| DE | 102 44 186 A1 | 4/2004 |

\* cited by examiner

*Primary Examiner*—Thanh X. Luu
*Assistant Examiner*—Tony Ko
(74) *Attorney, Agent, or Firm*—Maginot Moore & Beck

(57) ABSTRACT

The invention relates to a receiver arrangement for a push-pull transmission method. First and second signal detectors, to which a first input signal is fed provide first and second detector signals depending on a comparison of the first input signal with a detector threshold. Third and fourth signal detectors, to which a second input signal is fed provide third and fourth detector signals depending on a comparison of the second input signal with a detector threshold.

The first and third detector signals are respectively fed to a data input of a first and second buffer store. The second and fourth detector signals are respectively fed to a reset input of the first and second buffer store. The first and second buffer store are designed for buffer-storing signal pulses contained in the first and second detector signals and forwarding them to a respective output for subsequent further processing in time-delayed fashion after a first delay duration.

20 Claims, 10 Drawing Sheets

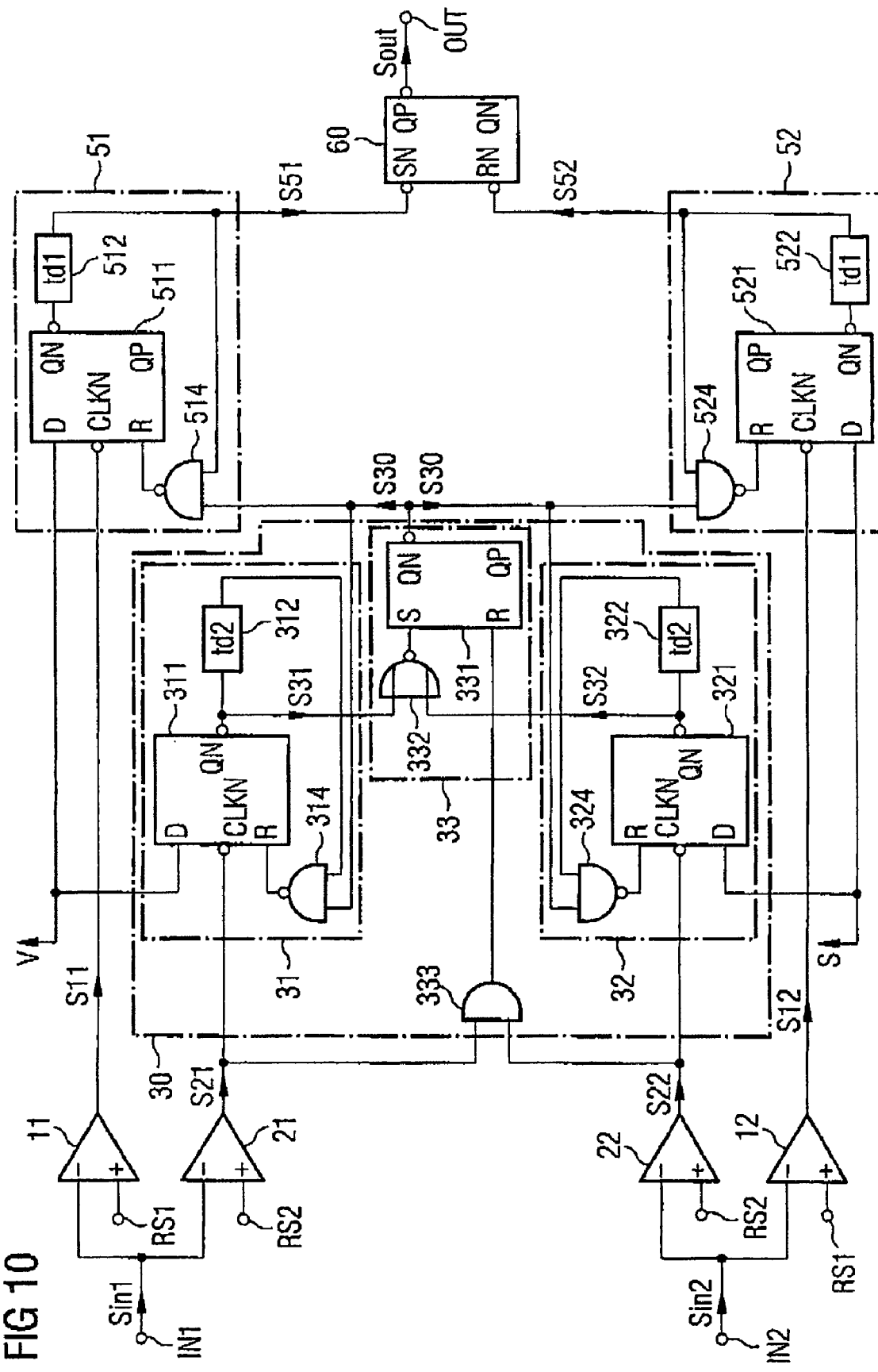

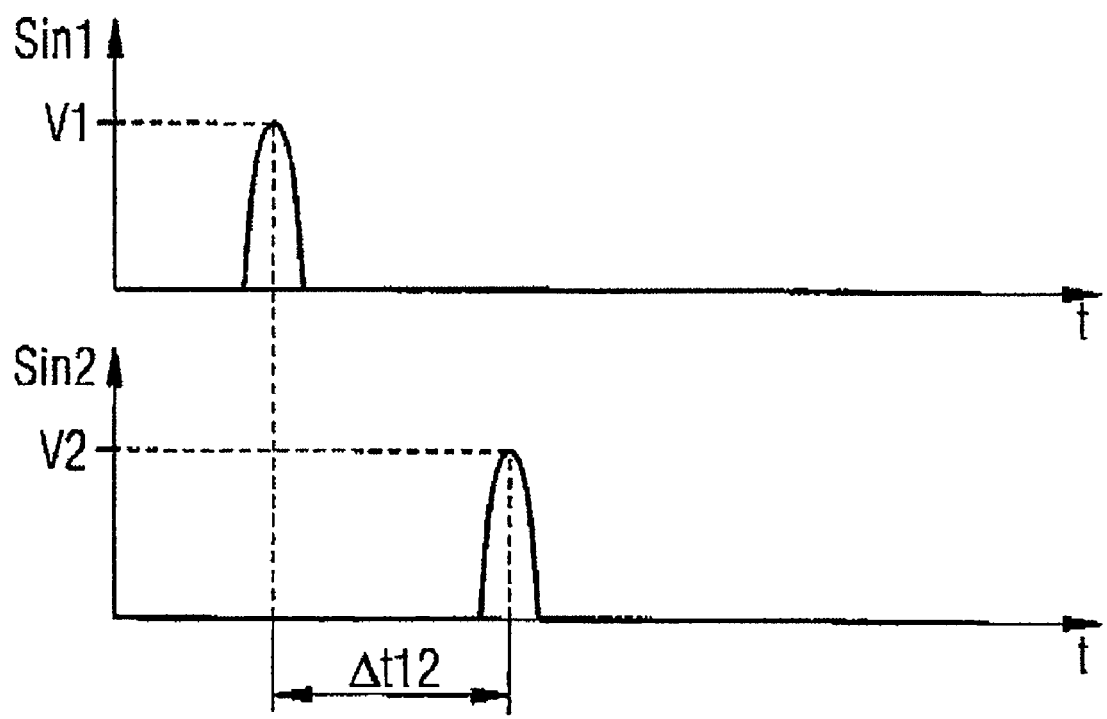

RECEIVER CIRCUIT FOR A PUSH-PULL TRANSMISSION METHOD

BACKGROUND

The present invention relates to a receiver circuit for a push-pull transmission method.

The basic mode of operation of such a push-pull transmission method is explained briefly below with reference to FIGS. 1 and 2.

FIG. 1 schematically shows a push-pull transmission arrangement having a transmission device 1, a first and second channel 2, 3 and a receiver device 4. The basic principle of such an arrangement consists in generating two complementary transmission signals Sout1, Sout2 from a two-value transmission signal Sin to be transmitted, which is fed to the transmission device 1, transmitting said transmission signals Sout1, Sout2 via the two separate channels 2, 3 and, in the receiver circuit 4, reconstructing the transmission signal from the signals Sin1, Sin2, that are available at the outputs of the channels 2, 3.

The transmission channels 2, 3 may be realized in arbitrary fashion and may, in particular, in each case comprise a transformer for potential decoupling of transmitter 1 and receiver 4. The illustration of suitable driver circuits for converting the complementary transmitter output signals Sout1, Sout2 to levels suitable for transmission, and of suitable demodulator circuits for converting the signals present at the channel outputs to levels suitable for processing by the receiver 4 has been dispensed with in the figure for reasons of clarity.

In order to transmit a two-value input signal Sin by means of a push-pull method via channels with potential barriers such as transformers, for example, it is known to convert a rising edge of the input signal Sin into a pulse on one of the two channels and a falling edge of the input signal Sin into a pulse on the other of the two channels, so that, during the transmission of such a two-value input signal Sin, pulses are never transmitted simultaneously on both channels. This is utilized for filtering at interference signals since it can be assumed that pulses that are received simultaneously on both channels are attributable to common-mode interference signals. The receiver circuit 4 must be designed to the effect that, in the event of simultaneous detection of reception signals on both channels, it ignores these signals, so that these signals have no effect on the output signal Sout.

FIG. 2 shows by way of example the signal profile in the case of such a push-pull transmission method. FIG. 2 shows the input signal Sin and the signals Sin1, Sin2 resulting from said input signal Sin at the channel outputs. In the example, an interference pulse is superposed on the channel output signals Sin1, Sin2, which interference pulse occurs simultaneously on both channels and is therefore filtered out in the reception circuit 4.

In principle, the circuit components of the push-pull transmission path must enable interference and useful signals to be distinguished unequivocally and ignore interference signals, in which case the transmission speed should be as high as possible, that is to say that the signal propagation times in the individual circuit components should be as low as possible, and the transmission arrangement should be able to be realized as cost-effectively as possible.

Difficulties in the suppression of interference signals can occur when interference signals which occur simultaneously on the two channels have differences in amplitude, so that the interference signal on one of the channels lies above a detection threshold and the interference signal on the other channel lies below a detection threshold, as a result of which a useful signal transmission is assumed incorrectly at the receiver end. Problems can also arise when the interference signals on the two channels occur with a slight temporal offset with respect to one another.

It is an aim of the present invention to provide a receiver arrangement for a push-pull transmission method which is robust with respect to the interference signals that occur during the signal transmission and which can additionally be realized simply and cost-effectively.

SUMMARY

The receiver arrangement according to the invention for a push-pull transmission method comprises: a first input for feeding in a first input signal, a second input for feeding in a second input signal and an output for providing an output signal depending on the input signals, first and second signal detectors, to which the first input signal is fed and which provide first and second detector signals depending on a comparison of the first input signal with a detector threshold, a first detector threshold of the first signal detector being greater than a second detector threshold of the second signal detector, third and fourth signal detectors, to which the second input signal is fed and which provide third and fourth detector signals depending on a comparison of the second input signal with a detector threshold, a third detector threshold of the third signal detector being greater than a fourth detector threshold of the fourth signal detector. The receiver circuit additionally comprises a first buffer store having a data input, to which the first detector signal is fed, having a reset input, to which a reset signal dependent at least on the fourth detector signal is fed, and having an output, and a second buffer store having a data input, to which the third detector signal is fed, having a reset input, to which a reset signal dependent at least on the second detector signal is fed, and having an output. The buffer stores are designed for buffer-storing signal pulses contained in the third and fourth detector signals and forwarding them to their respective output in time-delayed fashion. The receiver circuit additionally comprises a combination circuit for generating the output signal depending on output signals of the buffer stores.

In the case of the system according to the invention, the first detector threshold preferably corresponds to the third detector threshold and the second detector threshold preferably corresponds to the fourth detector threshold.

In the case of the receiver circuit according to the invention, the first and third signal detectors fulfill the function of useful signal detectors, the detector threshold of which is chosen in such a way that useful signal pulses contained in the input signals are detected. Such signal pulses that exceed the detector threshold of the first and third signal detectors are converted into signal pulses of the detector output signals of these signal detectors. In this case, the levels of the signal pulses of said detector output signals are chosen in a suitable manner for the further processing in the receiver circuit. The buffer stores connected downstream of the useful signal detectors are designed for buffer-storing signal pulses contained in the detector output signals for a first delay duration and forwarding them to the output after said first delay duration has elapsed. A signal pulse stored in one of the buffer stores is erased if the respective buffer store is reset or cleared by a reset signal present at its reset input within said first delay duration, so that this initially buffer-stored signal pulse cannot affect the output signal of the receiver circuit.

The second and fourth signal detectors of the receiver circuit have the function of interference signal detectors, the detector threshold of which is lower than the detector threshold of the first and third signal detectors serving as useful signal detectors. If the useful signal detector purportedly detects a useful signal pulse at one of the inputs, which pulse is stored in the buffer store respectively connected downstream, and if the interference signal detector likewise detects a signal pulse at the other of the inputs within the first delay duration, then the purported useful signal pulse is erased from the buffer store since it is assumed that two signal pulses received at the two inputs within the first delay duration result in each case from a common-mode interference signal which must not influence the output signal of the receiver circuit.

In this case, the receiver circuit according to the invention also identifies such common-mode interference pulses which are received with a temporal offset at the inputs and which have different amplitudes, if the temporal spacing is not greater than the first delay duration and the amplitude of both pulses exceeds the second detector threshold.

In an embodiment of the invention that can be realized in a particularly simple manner, it is provided that the detector output signal of the third signal detector serves as reset signal of the first buffer store, and that the detector signal of the second signal detector serves as reset signal for the second buffer store.

A reset circuit is preferably present, however, to which the second and fourth detector signals are fed, which detects signal pulses of the second and fourth detector signals and which provides a reset signal for the first and second buffer stores, which reset signal is dependent on a temporal spacing between a signal pulse of the second detector signal and a signal pulse of the fourth detector signal. This reset circuit is designed in particular to the effect that it resets the first and second buffer stores if the temporal spacing between a signal pulse of the second detector signal and a signal pulse of the fourth detector signal is less than a predetermined second time duration. This second time duration is preferably less than the first delay duration for which the first and second buffer stores buffer-store signal pulses.

In order to determine the temporal spacing between signal pulses of the second and fourth detector signals, the reset circuit preferably determines the temporal spacing between a predetermined edge of the second detector signal, for example the falling edge, and a corresponding predetermined edge of the fourth detector signal.

The receiver circuit comprises for example a third buffer store, to which the second detector signal is fed, a fourth buffer store, to which the fourth detector signal is fed, a combination circuit, to which an output signal of the third buffer store and an output signal of the fourth buffer store are fed and which provides the reset signal.

The combination circuit preferably comprises a storage element having a data input, a reset input and an output, a signal dependent on the output signals of the third and fourth buffer stores being fed to the data input and a signal dependent on the second and fourth detector signals being fed to the reset input, and the reset signal being available at the output of the storage element.

The buffer stores in each case for example comprise a storage element having a data input, a reset input and an output, and also an asymmetrical delay element connected downstream of the output, the delay element being designed for forwarding a first edge of an output signal of the storage element, for example a falling edge, with a different delay time than a second edge of the output signal of the storage element. The asymmetrical delay element preferably forwards the first edge with a predetermined delay time and the second edge in undelayed fashion. The predetermined delay time is in this case set for the first and second buffer stores such that it corresponds to the first delay time or buffer-storage time, and for the third and fourth buffer stores such that it corresponds to the second delay time or buffer-storage time.

The storage element of the buffer stores may be designed in particular as a flip-flop.

In order that the buffer store can also be cleared independently after the delay time of the delay element has elapsed, the output of the delay element may be coupled to the reset input of the storage element.

The present invention is explained in more detail below in exemplary embodiments with reference to figures.

BRIEF DESCRIPTION OF THE DRAWINGS

FIG. 10 shows a further exemplary embodiment of the receiver circuit according to the invention.

FIG. 11 illustrates two signal pulses that are present in a manner temporally spaced apart from one another in the first and second input signal.

In the figures, unless specified otherwise, identical reference symbols designate identical parts with the same meaning.

DESCRIPTION

Figure 1:
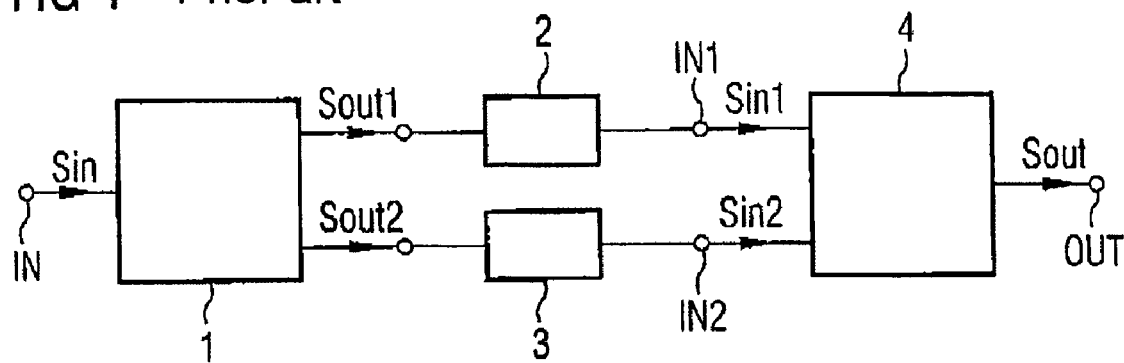
FIG. 1 schematically shows a push-pull transmission arrangement according to the prior art.
Figure 2:
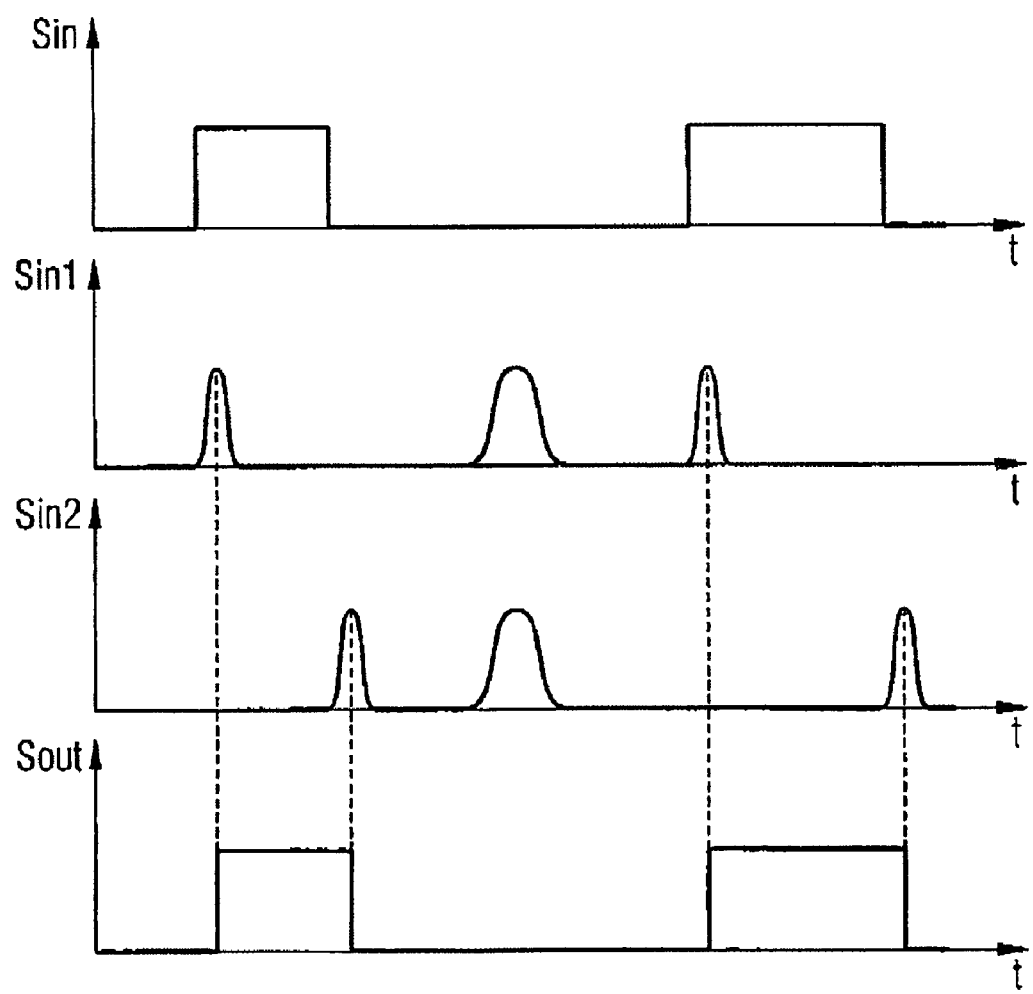
FIG. 2 shows by way of example selected signals of the transmission arrangement in accordance with FIG. 1.
Figure 3:
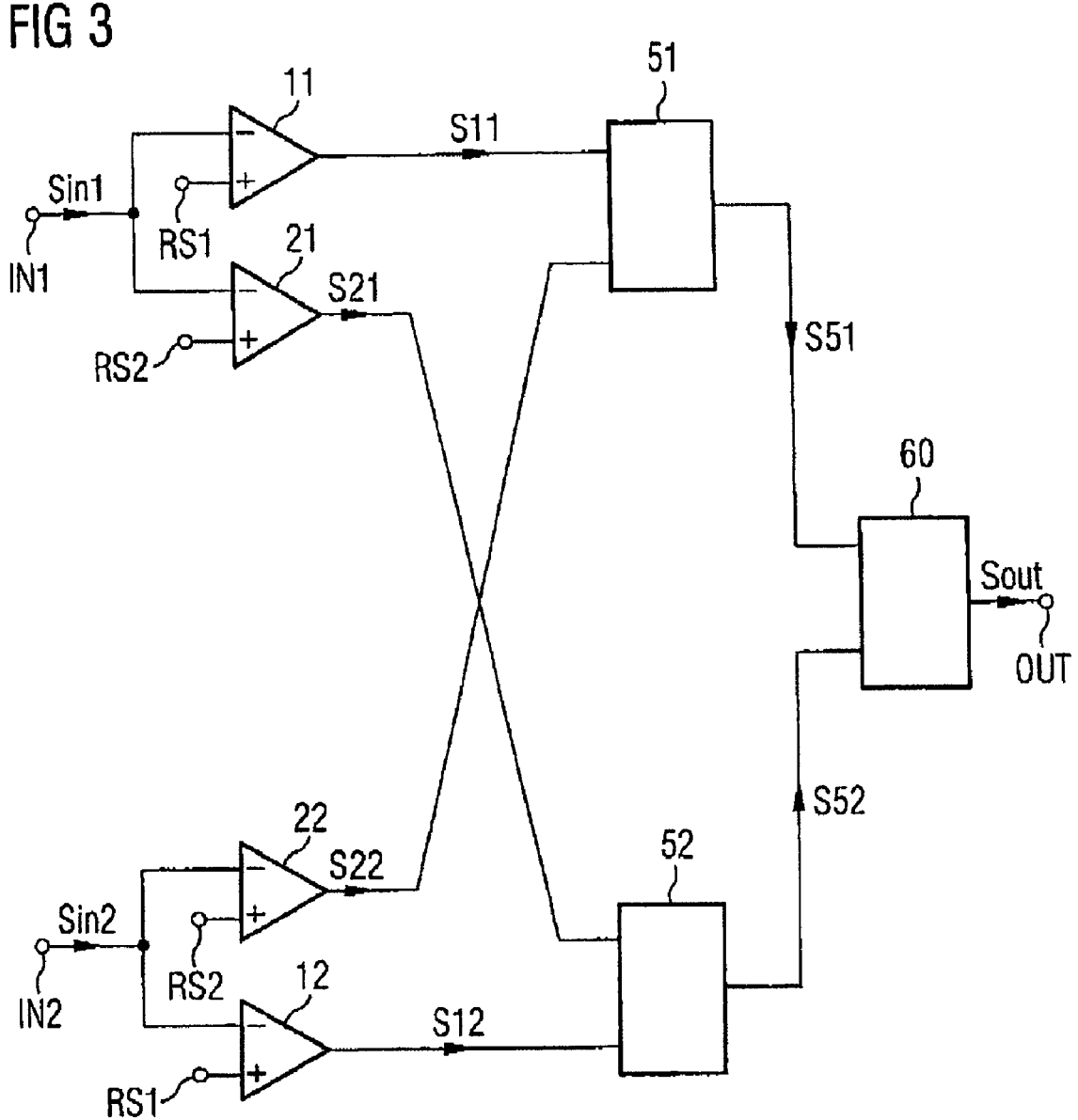
FIG. 3 shows a first exemplary embodiment of a receiver circuit according to the invention for a push-pull transmission method, said receiver circuit comprising two processing channels with in each case two signal detectors and a resettable buffer store.

Referring to FIG. 3, the receiver circuit according to the invention comprises a first and a second input IN1, IN2 for feeding in a first and a second input signal Sin1, Sin2. The receiver circuit illustrated is constructed symmetrically and comprises a first processing channel having a first signal detector 11, a second signal detector 21 and also a first buffer store 51, and a second processing channel having a third signal detector 12, a fourth signal detector 22 and a second buffer store 52. Output signals S51, S52 of these processing channels are fed to a combination circuit 60, which provides an output signal Sout at an output OUT.

The first signal detector 11 compares the first input signal Sin1 with a first detector threshold RS1 and provides a first detector signal S11 depending on this comparison, which signal is fed to a data input of the first buffer store 51. The third signal detector 12 correspondingly compares the second input signal Sin2 with the first detector threshold RS1 and provides a third detector signal S12 depending on the comparison, which signal is fed to a data input of the second buffer store. The first and third signal detectors 11, 12 serve as useful signal detectors, the first detector threshold RS1 being chosen in such a way that it is exceeded by useful signal pulses contained in the input signals Sin1, Sin2, in order to be able to detect these useful signals.

The second signal detector 21 compares the first input signal Sin1 with a second detector threshold RS2 and provides a second detector signal S21 depending on the comparison, which signal, in the exemplary embodiment, serves as reset signal for the second buffer store 52 and is fed to a reset input of said second buffer store 52. The fourth signal detector 22 correspondingly compares the second input signal Sin2 with the second detector threshold RS2 and provides a fourth detector signal S22 depending on the comparison, which signal serves as reset signal for the first buffer store 51 and is fed to a reset input of said first buffer store 51.

The second and fourth signal detectors 21, 22 in each case serve for identifying interference signal pulses, as will be explained.

The first and second buffer stores 51, 52 are in each case designed for buffer-storing signal pulses of the first and third detector signals S11, S12 and forwarding them to their respective output after a first delay duration td1 if the respective buffer store is not reset within said first delay duration.

The receiver circuit illustrated is able to detect useful signal pulses which in each case lead to a change in the level of the two-value output signal available at the output, but to effectively suppress common-mode interference signals. This mode of operation is explained below with reference to FIG. 4.

Figure 4:
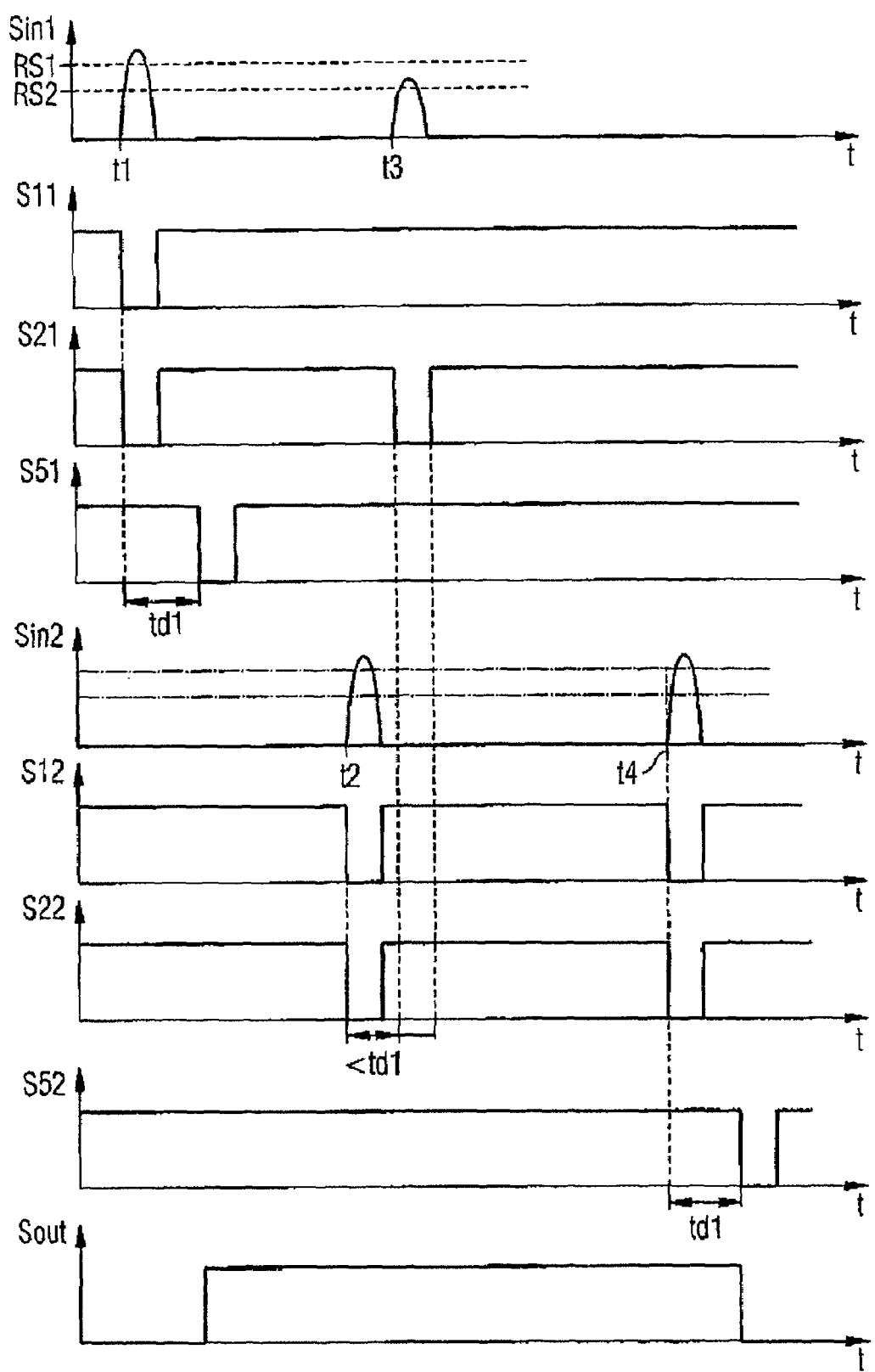
FIG. 4 shows by way of example selected signals of the receiver circuit illustrated in FIG. 3.

FIG. 4 shows by way of example temporal profiles of the first input signal Sin1, of the first and second detector signals S11, S21 resulting from said first input signal Sin1, of the second input signal Sin2 and of the third and fourth detector signals S12, S22 resulting from said second input signal Sin2. Moreover, FIG. 4 illustrates the output signals S51, S52 of the buffer stores, said output signals resulting from the detector signals S11, S21, S12, S22, and the temporal profile of the output signal Sout resulting from the buffer store output signals S51, S52.

At an instant t1, the first input signal Sin1 has a signal pulse that is detected by the first and second signal detectors 11, 21. In order to simplify the illustration, it is assumed in FIG. 4 that this signal pulse exceeds the first and second detector thresholds RS1, RS2 approximately simultaneously at an instant t1. Signal pulses of the first and second detector signals S11, S21 result from said signal pulse. In the example, the signal detectors 11, 21 are chosen such that the detector output signals S11, S21 have a high level if no signal pulse is detected at the first input IN1, and that they have a low pulse in the event of detection of a signal pulse at the first input IN1. The signal pulse of the first detection signal S11 resulting from the input pulse is stored in the first buffer store 51 and is forwarded to its output after a first delay duration td1 has elapsed.

In connection with the present invention, buffer-storing a signal pulse and forwarding such a signal pulse in time-delayed fashion are not necessarily to be understood to mean that the buffer-stored signal pulse and the signal pulse that is forwarded in time-delayed fashion have the same time duration. Depending on the concrete circuitry realization of the buffer stores 51 and 52 and the combination circuit 60 connected downstream, storing a pulse may also mean storing one of the edges, for example the falling edge, of the pulse and forwarding this edge in time-delayed fashion with the first delay duration td1.

In the example, the second input signal Sin2 has a signal pulse which exceeds the first and second detector thresholds RS1, RS2 at an instant t2, resulting in low pulses of the third and fourth detector signals S12, S22. In this case, the low pulse of the third detector signal S12 is stored in the second buffer store 52. At an instant t3, the temporal spacing of which with respect to the instant t2 is less than the first delay duration td1, the first input signal Sin1 has a further signal pulse which exceeds the second detector threshold RS2 and which leads to a low pulse of the second detector signal S21. This signal pulse of the second detector signal S21 resets the second buffer store 52, as a result of which the previously stored signal pulse is erased, so that no change occurs in the output signal S52 of said second buffer store 52. In the case of the signal pulses occurring at the instants t2 and t3, it is assumed that these signal pulses are attributed to a common-mode interference signal, but this does not preclude the fact that these signal pulses may have a slight temporal offset with respect to one another and may have slightly different amplitudes. Even if the amplitude of one of these two signal pulses is large enough to exceed the first detector threshold RS1 adapted to useful signal pulses, this signal pulse does not not lead to a change in the output signal since it is erased again from the second buffer store 52 during the buffer-storage duration.

In the example, a further signal pulse of the second input signal Sin2 occurs at an instant t4, no signal pulse which exceeds the second detector threshold RS2 being present in the first input signal Sin1 within the first delay duration td1. Therefore, said signal pulse brings about a change in the output signal of the second buffer store S52 after the delay time td1 has elapsed.

In the exemplary embodiment illustrated, in accordance with FIG. 3 the combination circuit 60 is designed in such a way that it generates a high level upon a falling edge of the output signal S51 of the first buffer store and a low level upon a falling edge of the output signal S52 of the second buffer store, as becomes clear on the basis of the temporal profile of the output signal Sout depending on the buffer store output signals in FIG. 4. The combination circuit may be realized for this purpose for example as a negative-edge-triggered flip-flop.

If, in the case of the receiver circuit, the amplitudes of the signal pulses at the inputs IN1, IN2 are less than the first detector threshold RS1 but greater than the second detector threshold RS2, then reset pulses are in each case generated for the first and second buffer stores 51, 52. These reset pulses remain ineffective in this case, however, since no signal pulses are stored in the buffer stores 51, 52.

Signal pulses at the inputs IN1, IN2 which lie below the second detector threshold RS2 are completely ignored by the receiver circuit.

If common-mode interference pulses are received at the inputs IN1, IN2 in the case of the receiver circuit in accordance with FIG. 3, one of which pulses exceeds the first detector threshold RS1 but the other of which pulses exceeds only the second detector threshold RS2, then the signal pulse which results from the larger of the two signal pulses and is buffer-stored in the respective buffer store is erased again by the smaller of the two signal pulses when the larger of the two signal pulses is received temporally before the smaller of the two signal pulses. If the temporal order is reversed, then the buffer-stored signal pulse is not erased and is finally forwarded to the combination circuit 60.

Figure 5:
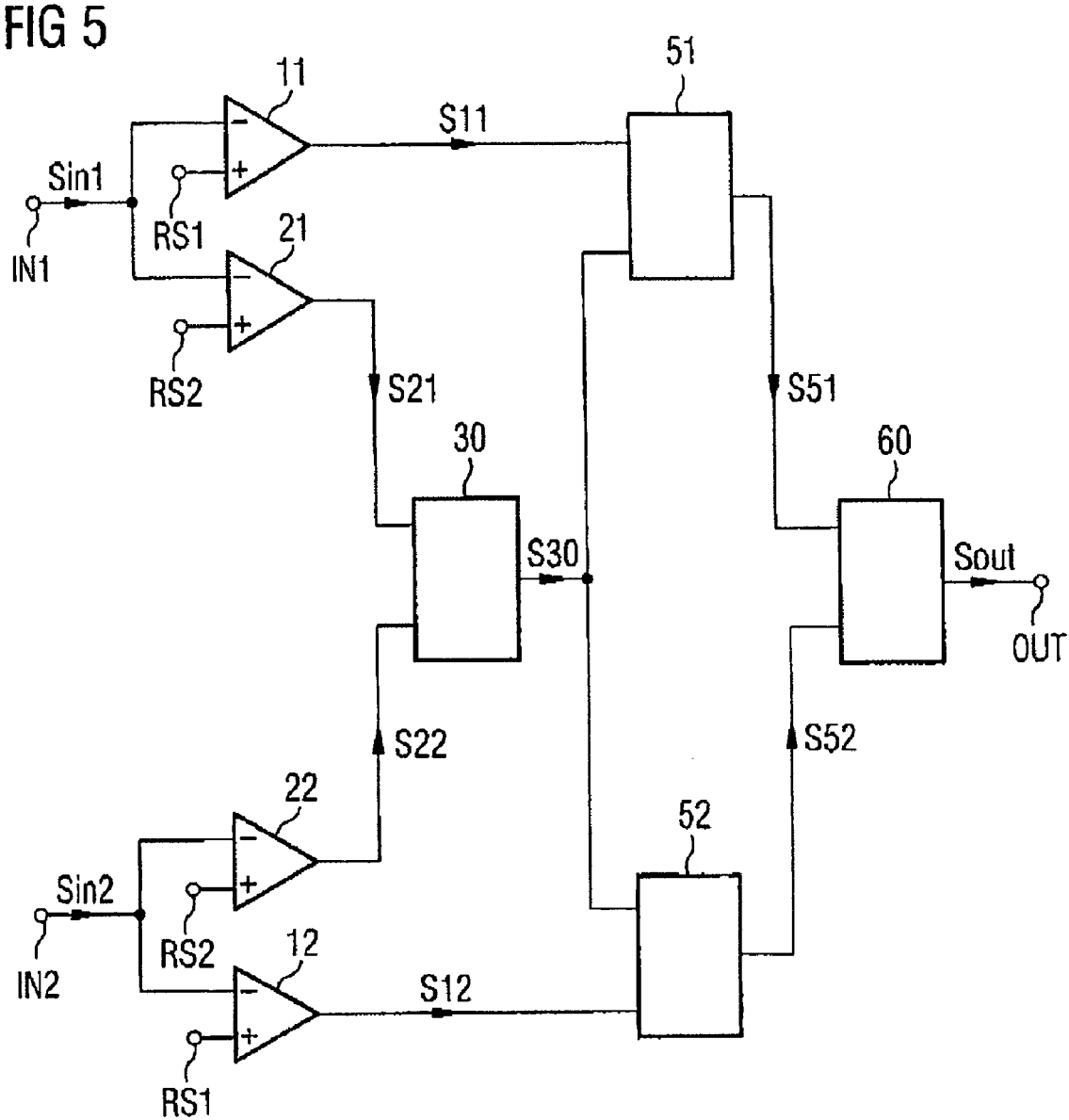
FIG. 5 shows a second exemplary embodiment of the receiver circuit according to the invention.

FIG. 5 shows an exemplary embodiment of a receiver circuit according to the invention in which this problem is avoided, and in which a signal pulse is erased from the buffer store of a processing channel whenever a signal pulse which exceeds at least the second detector threshold is detected at the input of the other processing channel within a predetermined time duration before or after the storage of the former signal pulse. This receiver circuit comprises a reset circuit 30, to which the detector output signals S21, S22 of the second and fourth signal detectors 21 and 22 are fed and which generates a reset signal S30 depending on the temporal spacing between a signal pulse contained in the second detector signal S21 and a signal pulse contained in the fourth detector signal S22, to be precise irrespective of which of the two signal pulses occurs first chronologically. In this case, the reset circuit 30 is designed to the effect that it resets the buffer stores 51, 52 by means of the reset signal S30 if signal pulses of the second and fourth detector signals S21, S22 occur within a predetermined time window of a time duration td2. This time duration td2 is preferably less than the delay duration or storage duration td1 of the first and second buffer stores 51, 52.

Figure 6:
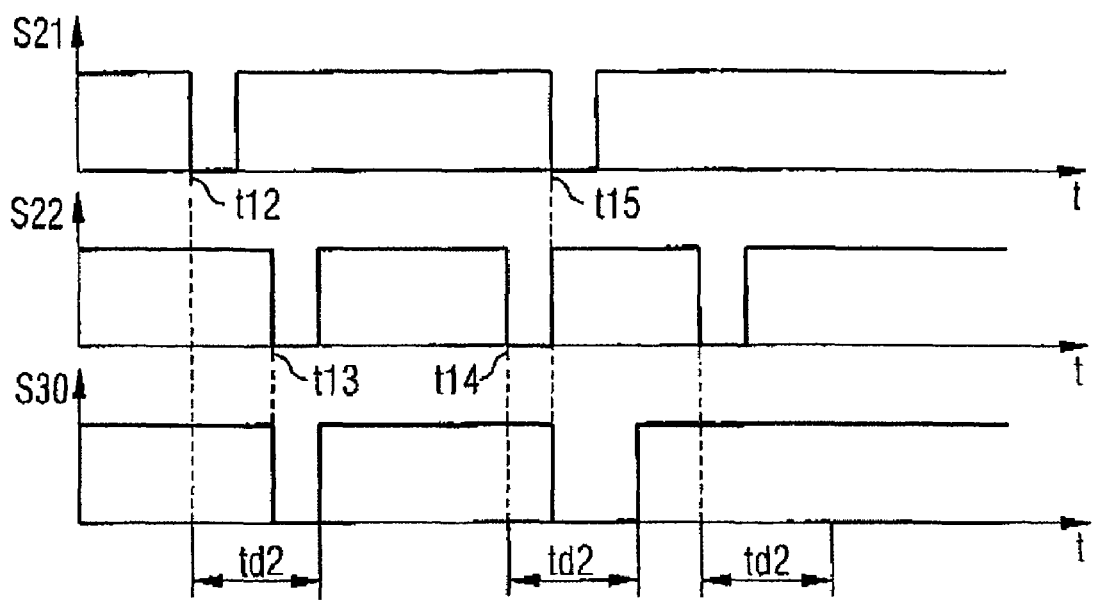
FIG. 6 illustrates the mode of operation of a reset circuit present in the receiver circuit in accordance with FIG. 5 on the basis of selected signal profiles.

The mode of operation of the reset circuit 30 becomes clear with reference to FIG. 6, which shows by way of example temporal profiles of the second and fourth detector signals S21, S22 and of the reset signal S30. In the example, the second detector signal S21 comprises a low pulse at an instant t12 and the fourth detector signal S22 comprises a low pulse at an instant t13, the temporal spacing between these two instants t12, t13 being less than the time window td2, so that the reset signal S30 has a low pulse at the instant t13 in order to reset or clear the buffer stores 51, 52. It should be pointed out that, depending on the concrete configuration of the buffer stores 51, 52, the reset signal S30 may, of course, also be chosen such that it has a high pulse in order to reset the buffer stores 51, 52.

The temporal sequence of the low pulses of the detector signals is unimportant in this case for the generation of the low pulse of the reset signal S30, as is shown by the further temporal profile in which the fourth detector signal S22 has a low pulse at an instant t14 and the second detector signal S21 has a low pulse at a later instant t15. In this case, the temporal spacing between these instants t14, t15 is less than the time window td2, so that the reset signal S30 has a low pulse for resetting the buffer stores 51, 52 at the instant t15. As is illustrated in the further temporal profile, a low pulse of the reset signal S30 is not generated if only one of the two detector signals S21, S22 has a low pulse within the time window td2.

Figure 7:
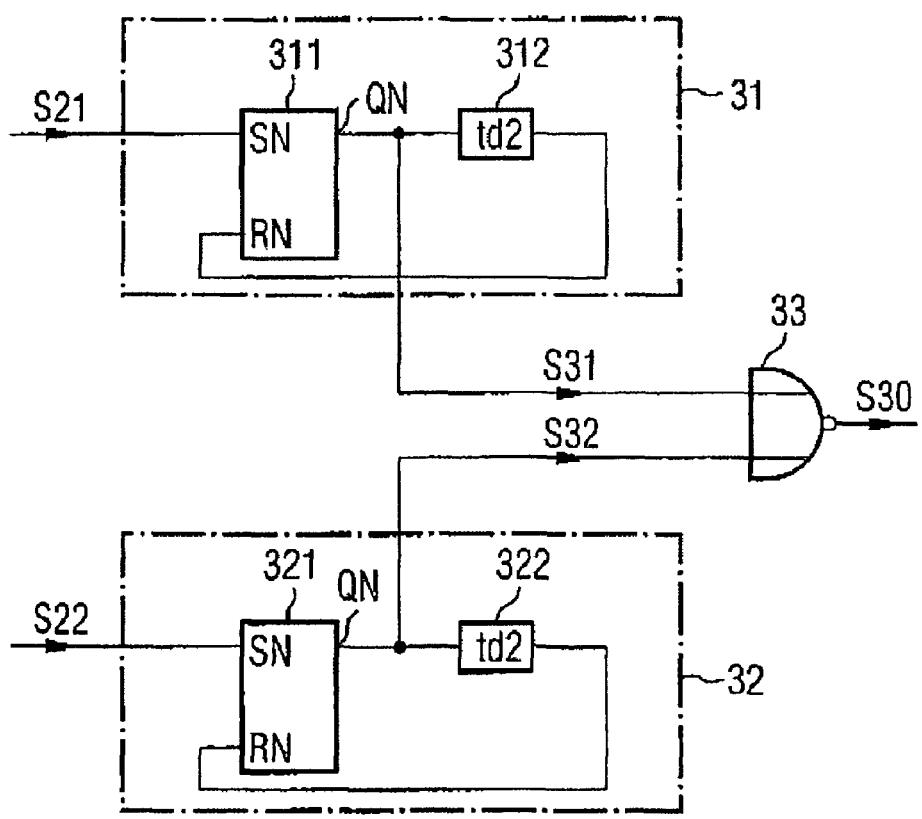
FIG. 7 shows an exemplary realization of the reset circuit.

FIG. 7 shows an exemplary circuitry realization of a reset circuit 30 with the function illustrated in FIG. 6.

This reset circuit comprises a third buffer store 31 and a fourth buffer store 32 and also a combination circuit 33, to which the output signals S31, S32 of the buffer stores 31, 32 are fed. The combination element 33 is realized as an OR gate in the example.

The buffer stores 31, 32 in each case comprise a storage element 311, 321, which is formed as a negative-edge-triggered RS flip-flop in the exemplary embodiment, to the set input SN of which one of the detector signals S21, S22 is fed in each case. Connected downstream of the inverting input QN of these flip-flops 311, 321 there is in each case an asymmetrical delay element 312, 322, which is designed for forwarding a predetermined edge of the output signal, the falling edge in the example, to the output of the respective asymmetrical delay element 312, 322 with a delay time corresponding to the second time duration td2. In this case, the outputs of the delay elements 312, 322 are in each case coupled to the reset inputs RN of the flip-flops 311, 321. The output signals S31, S32 of the buffer stores 31, 32 are in each case formed by the signals at the inverting outputs QN of the flip-flops 311, 321.

The method of operation of the two buffer stores 31, 32 is briefly explained below. The flip-flops 311, 321 are set upon a negative edge of the respective detector signal S21, S22, which results in a falling edge and, in the further course of events, a low level of the signal S31, S32 at the respective inverting output QN of the flip-flops 311, 321. The flip-flops 311, 321 are reset after setting by means of the asymmetrical delay element 312, 322 in each case after the second delay time td2 has elapsed, in order to set the signal at the inverting output QN to a high level again. The reset signal S30 assumes a low level only when the output signals of both flip-flops 311, 312 have a low level, that is to say when both flip-flops 311, 321 have been set by means of signal pulses at the set inputs SN within the second time duration td2.

Figure 8A:
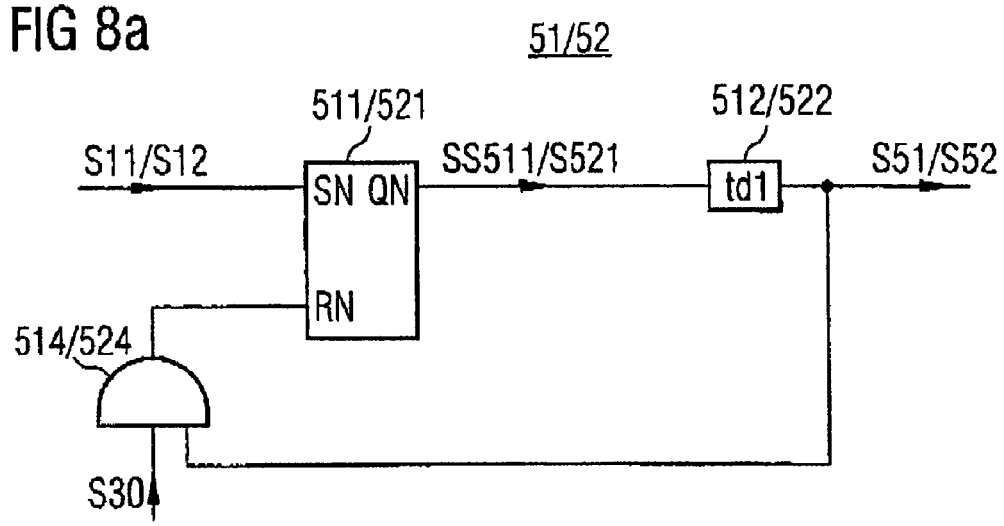
FIG. 8 shows an exemplary realization of the buffer stores (FIG. 8a) and the mode of operation thereof on the basis of selected signal profiles (FIG. 8b).

An exemplary circuitry realization of the first and second buffer stores 51, 52 is illustrated in FIG. 8. These buffer stores 51, 52 likewise in each case comprise a storage element 511, 521, which is formed as a negative-edge-triggered flip-flop in the example. Connected downstream of the storage element 511, 521 there is an asymmetrical delay element, which, in the example, is designed for forwarding a falling edge at the inverting output QN of the flip-flop 511, 521 to the output of the buffer store in time-delayed fashion with the first delay duration td1. The first detector signal S11, S12 is fed to the set input SN of the flip-flop 511, 521, which detector signal, referring to the previous explanation, upon detection of a signal pulse, has a falling edge which sets the flip-flop 511, 521. The reset signal S30 and the output signal S51, S52 of the buffer store are fed to the reset input RN of the flip-flop 511, 521 via an AND gate, the feedback of said output signal to the reset input RN optionally being effected in order to clear the buffer store after a signal pulse has been forwarded to its output.

Figure 8B:
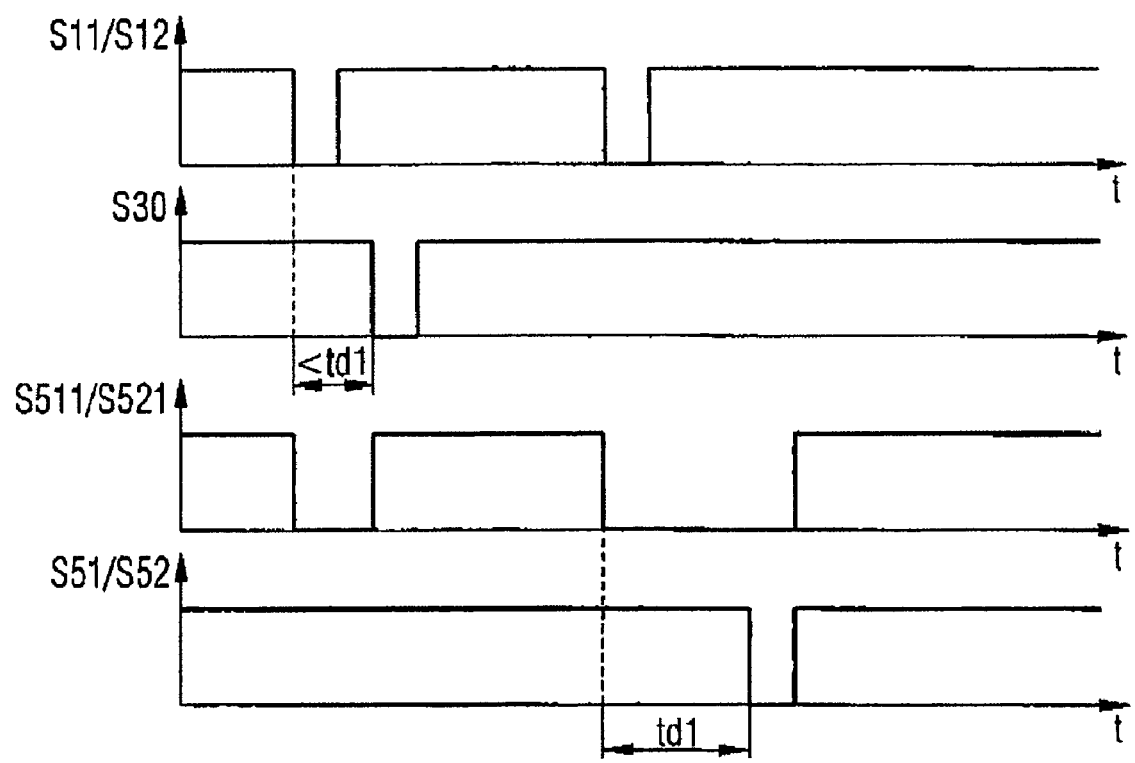

The mode of operation of this buffer store becomes clear on the basis of the temporal profiles illustrated in FIG. 8b. The flip-flop 511, 521 is set with a falling edge of the detector signal S11, S12, as a result of which the flip-flop output signal S511, S521 assumes a low level. If the flip-flop is reset by the reset signal S30 within the first delay time td1, then the buffer store output signal S51, S52 does not change since the asymmetrical delay element 512, 522 forwards the then rising edge of the flip-flop output signal S511, S521 in undelayed fashion. A change in the buffer store output signal S51, S52 occurs only when the flip-flop is not reset within the first delay duration td1 after a falling edge of the detector signal S11, S12.

Figure 9A:
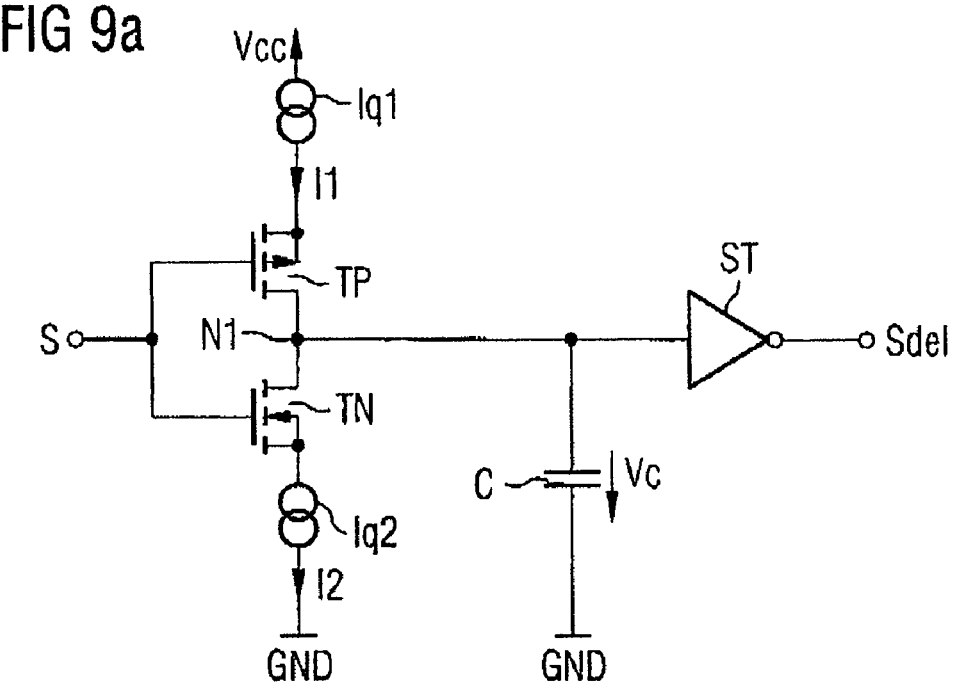
FIG. 9 shows the construction of an asymmetrical delay element (FIG. 9a) and illustrates the mode of operation thereof on the basis of temporal profiles of the signals occurring in the asymmetrical delay element (FIG. 9b).

An exemplary circuitry realization of one of the asymmetrical delay elements 312, 322, 512, 522 illustrated in FIGS. 7 and 8, which is designed for mapping a falling edge of an input signal s with a greater delay duration than a rising edge of an input signal onto an output signal Sdel, is explained below with reference to FIGS. 9a and 9b. The asymmetrical delay element in accordance with FIG. 9a is designed for forwarding falling edges of the input signal S with a first delay time $\Delta tl$ and rising edges of the input signal S with a second delay time $\Delta th$ to the output signal Sdel. The delay element comprises a series circuit having a first current source Iq1 and a p-channel transistor TP and also a series circuit having an n-channel transistor TN and a second current source Iq2, these series circuits being connected in series between a supply potential Vcc and a reference-ground potential GND. The two transistors TP, TN are driven complementarily with respect to one another by the input signal S. A capacitor C is connected between a node N1 common to the two transistors TP, TN and a reference-ground potential GND. An inverting Schmitt trigger ST with an upper detection threshold Vh and a lower detection threshold Vl compares a voltage VC across the capacitor with said detection thresholds and provides the output signal Sdel depending on the comparison results.

Figure 9B:
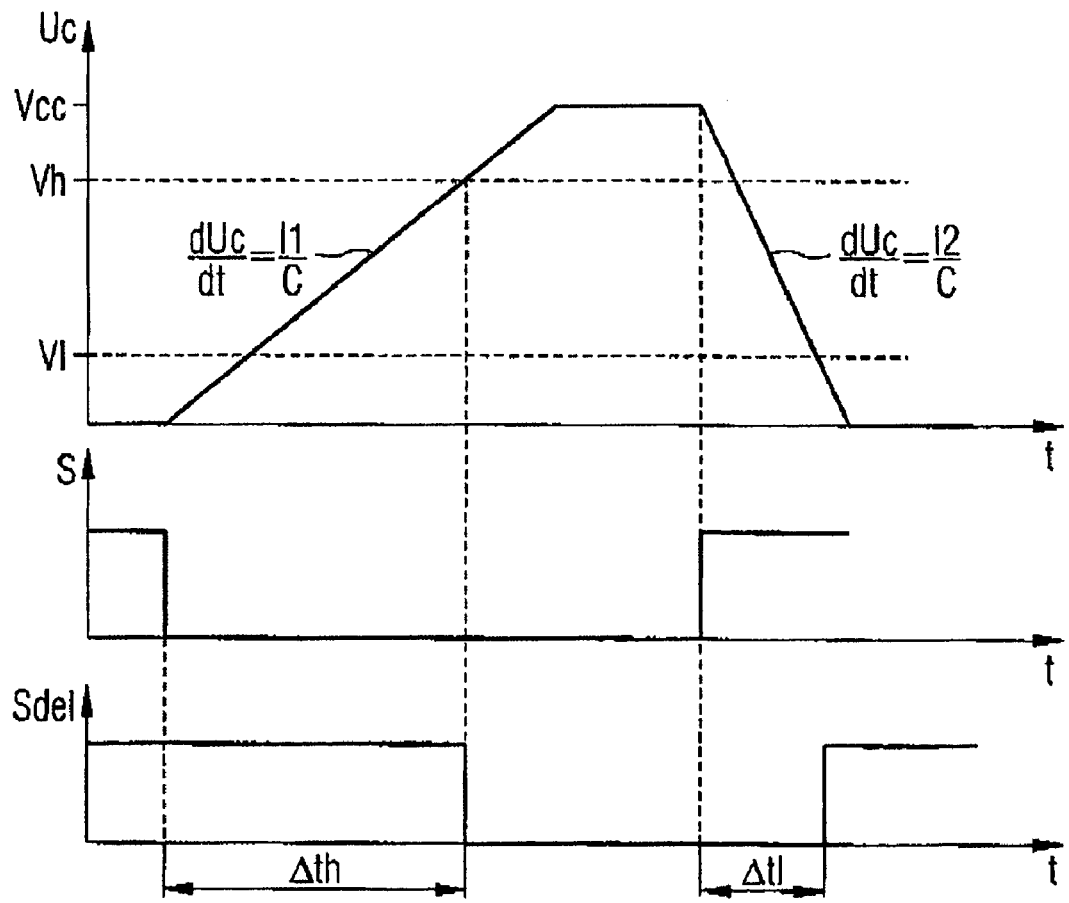

FIG. 9b shows temporal profiles for the input signal S and the output signal Sdel dependent thereon for the delay element illustrated in FIG. 9a. If the input signal S assumes a low level, then the low-side transistor TN turns off and the capacitor C is charged with a current I1 by means of the current source Iq1, as a result of which the voltage Vc across the capacitor C rises linearly. If this voltage reaches the value of the upper detection threshold Vh, then the output signal Sdel of the inverting Schmitt trigger ST assumes a low level. The delay duration $\Delta t1$ between the falling edge of the input signal S and the falling edge of the output signal Sdel is in this case proportional to the current I1 and the upper detection threshold Vh of the inverting Schmitt trigger ST. The capacitor C is also charged up to the supply voltage Vcc in the further course of events.

If the input signal S subsequently assumes a high level, then the high-side transistor TP turns off and the low-side transistor TN turns on, as a result of which the capacitor C is discharged by means of a current I2 supplied by the current source Iq2. In this case, the output signal Sdel assumes a high level as soon as the voltage Vc across the capacitor C has fallen below the value of the lower detection threshold Vl. The delay time between a rising edge of the input signal S and a signal S and a rising edge of the output signal Sdel is dependent on the difference between the supply voltage Vcc and the lower switching threshold Vl and proportional to the second current I2. Said second current I2 has a greater magnitude than the first current I1, in order that the capacitor C is discharged more rapidly than it is charged, this resulting in different delay times for falling edges and rising edges of the input signal S.

An exemplary embodiment that is not specifically illustrated provides for the second current source Iq2 to be dispensed with, as a result of which rising edges of the input signal S are forwarded virtually without any delay to the output signal Sdel, since the capacitor C is short-circuited by the on-state driving of the low-side transistor TN after a rising edge of the input signal S.

FIG. 10 shows a further exemplary circuitry realization of the receiver circuit according to the invention. In the case of this receiver circuit, the storage elements 311, 321, 511, 521 in the buffer stores 31, 32, 51, 52 are designed as D-type flip-flops, the data input D of which is in each case connected to a positive supply potential V. The detector signals S21, S22, S11, S12, which in each case have a falling edge upon detection of a signal pulse at the inputs IN1 and IN2, respectively, are in each case fed to the clock inputs CLKN of the flip-flops 311, 321, 511, 521. The asymmetrical delay elements 312, 322, 512, 522 are in each case connected downstream of the inverting outputs QN of the flip-flops. A falling edge is present at said inverting outputs QN when a falling edge is applied to the respective clock input CLKN.

The reset circuit 30 is designed to generate a falling edge of the reset signal S30 upon detection of an interference signal, that is to say when the second and fourth detector signals S21, S22 comprise signal pulses within the second time duration td2, in order to clear the first and second buffer stores 51, 52. These first and second buffer stores 51, 52 are cleared by the resetting of the flip-flops 511, 521 by means of a suitable signal at the reset input R thereof. Said flip-flops 511, 512 are cleared by application of a high level to the reset input R thereof. In order to generate such a high level from the reset signal S30, NAND gates are in each case present in the buffer stores 51, 52, the reset signal S30 and the fed-back output signals S51, S52 of the buffer stores 51, 52 being fed to said NAND gates. The two buffer stores 51, 52 are in each case cleared if the reset signal S30 assumes a low level, or if the respective output signal S51, S52 of the buffer stores assumes a low level, that is to say when a signal pulse of the first and second detector signals S11, S12 has been forwarded to the output of the respective buffer stores 51, 52 in time-delayed fashion.

The combination circuit 60 at the output of the receiver circuit is designed as a flip-flop which is set upon a falling edge of the output signal S51 of the first buffers store 51 and which is reset upon a falling edge of the output signal S52 of the second buffer store 52. The output signal Sout is present at the non-inverting output QP of said flip-flops 60. The output signal Sout consequently assumes a high level upon detection of a signal pulse at the first input signal Sin1 which leads to a falling edge of the output signal S51 of the first buffer store 51 in time-delayed fashion, while the output signal assumes a low level after detection of a signal pulse of the second input signal Sin2 which leads to a falling edge of the output signal S52 of the second buffer store 52 in time-delayed fashion.

In the exemplary embodiment, the buffer stores 31 and 32 of the reset circuit 30 are cleared by means of the output signals of the asymmetrical delay elements 312, 322 and by means of the reset signal S30. For this purpose, the reset signal S30 and the output signals of the asymmetrical delay elements 312, 322 are fed to the reset inputs R of the flip-flops 311, 321 via respective NAND gates 314, 324.

In order to convert the buffer store signals S31, S32 available at the inverting outputs QN of the D-type flip-flops 311, 321 to the reset signal S30, a combination circuit 33 having a NOR gate 332 and an RS flip-flop 331 connected downstream of the gate 332 is present in the exemplary embodiment, the reset signal S30 being present at an inverting output QN of said RS flip-flop. The flip-flop 331 is set by means of the output signal of the NOR gate 332 as soon as both output signals S31, S32 of the buffer stores 31, 32 assume a low level. As already explained previously, the two output signals S31, S32 jointly assume a low level only when signal pulses are detected in the input signals Sin1, Sin2 by means of the second and fourth signal detectors 21, 12 within the second delay duration td2.

In the exemplary embodiment, the flip-flop 331 of the combination circuit is reset via an AND gate 333, to which the detector output signals S21, S22 are fed, only when the interference pulses purportedly detected by the second and fourth signal detectors 21, 22 have decayed, that is to say when the detector output signals S21, S22 both have a high level. This ensures that the reset signal S30 has a low level even in the case of lengthy common-mode interference pulses, the time duration of which is longer than the second time duration td2, until both interference pulses have decayed, in order thereby to prevent storage of signal pulses in the first and second buffer stores 51 and 52 during said time duration.

To summarize, in the case of the receiver circuit according to the invention, signal pulses at the inputs IN1, IN2 which exceed the first detector threshold RS1 are interpreted as useful signal pulse and buffer-stored in one of the buffer stores 51, 52. Provided that a signal pulse that exceeds at least the second detector threshold RS2 is detected at the respective other input within a time window—predefined by the second time duration td2—before or after storage of such a useful signal pulse, the useful signal pulse is erased again from the buffer store 51, 52 since it is assumed in this case that both signal pulses resulted from a common-mode interference signal. In this case, the first delay duration td1 during which potential useful signal pulses are buffer-stored in the first and second buffer stores 51, 52 is preferably greater than the second time duration td2 for which potential interference signal pulses are stored in the buffer stores 31, 32 of the reset circuit 30. In this case, the first time duration td1 is preferably approximately twice as long as the second time duration td2.

The robustness of the receiver circuit according to the invention with regard to the suppression of common-mode interference signals is adjustable by way of the detector threshold RS1, RS2 and the second time window td2.

FIG. 11 schematically shows two temporally successive signal pulses of the first and second input signals Sin1, Sin2 but which have an amplitude V1 and an amplitude V2. The temporal spacing between these two pulses is $\Delta t12=t2-t1$. The fact of whether these signal pulses are treated as useful signal pulses or as interference signal pulses by the receiver circuit is dependent on the temporal spacing and on the amplitudes V1, V2 of said signal pulses.

In principle, it holds true that two successive signal pulses on different channels are completely ignored by the receiver circuit if their amplitudes V1, V2 are less than the second detector threshold RS2.

If the amplitudes V1, V2 of the two signals are less than the first detector threshold RS1 but greater than the second detector threshold RS2, then although it is possible for a reset signal to be generated by the reset circuit 30 depending on the temporal spacing of the signal pulses, no signal pulses are stored in the first and second buffer stores 51, 52, so that signal pulses which exceed only the second detector threshold RS2 cannot affect the output signal of the receiver circuit.

Figure 12A:
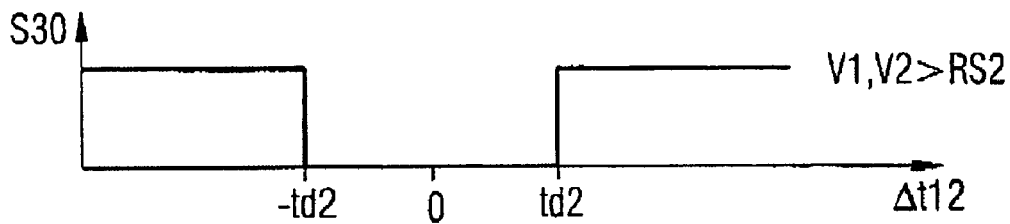
FIG. 12 illustrates the effects of the temporal pulse spacing of the two pulses on the reset signal (FIG. 12a) and the output signal (FIGS. 12b and 12c) for amplitudes of the signal pulses above the second detector threshold.

The mode of operation of the receiver circuit according to the invention becomes clear particularly with reference to FIG. 12, which shows the level of the reset signal S30 as a function of the temporal spacing $\Delta t12$ of the signal pulses for different amplitudes of the signal pulses. FIG. 12a shows the level of the reset signal S30 as a function of the temporal spacing $\Delta t12$ for signal pulses V1, V2 whose amplitudes are in each case greater than the second detector threshold RS2. As explained, the reset signal S30 assumes a low level in order to reset the first and second buffer stores 51, 52 when the magnitude of the temporal spacing $\Delta t12$ between the signal pulses is less than the second term duration td2. If the temporal spacing of the signal pulses is greater than said time duration td2, then the reset signal S30 maintains a high level which does not influence the buffer stores 51, 52.

Figure 12B:
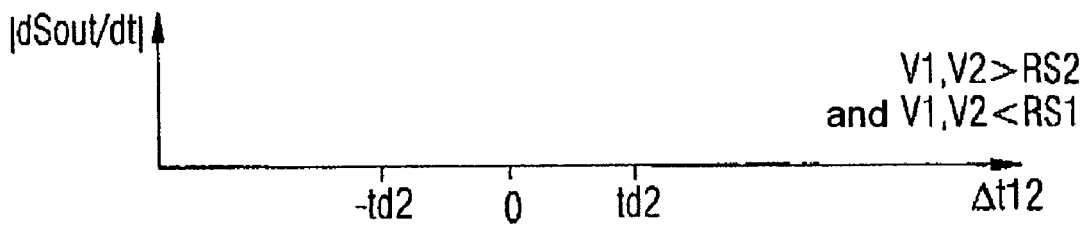

The extent to which the signal pulses think about a change in the output signal Sout depends on whether at least one of the two signal pulses exceeds the first detector threshold. Changes in the output signal Sout are designated in FIG. 12 by |dSout/dt|, that is to say the magnitude of the temporal change in the output signal. FIG. 12b shows the change in the output signal as a function of the temporal spacing $\Delta t12$ for two signal pulses which are in each case less than the first detector threshold. Irrespective of their temporal spacing, these signal pulses cannot lead to a change in the output signal since they are not identified as useful signal pulses and stored in the buffer stores 51, 52.

Figure 12C:
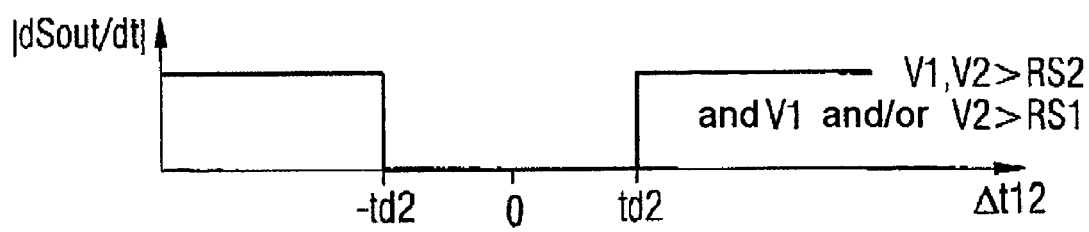

If at least one of the two signal pulses V1, V2 exceeds the first detector threshold, then this signal pulse can bring about a change in the output signal only when the temporal spacing of the two signal pulses is greater than the second time duration td2, as is illustrated in FIG. 12c. In the case of temporal spacings between the signal pulses shorter than said second time duration td2, useful signal pulses stored in the buffer stores 51, 52 are erased and thus cannot lead to a change in the output signal. Signal pulses which exceed the first detector threshold and whose temporal spacing is greater than the second time duration td2, however, are interpreted as useful signals and lead to changes in the output signal Sout.

Figure 13A:
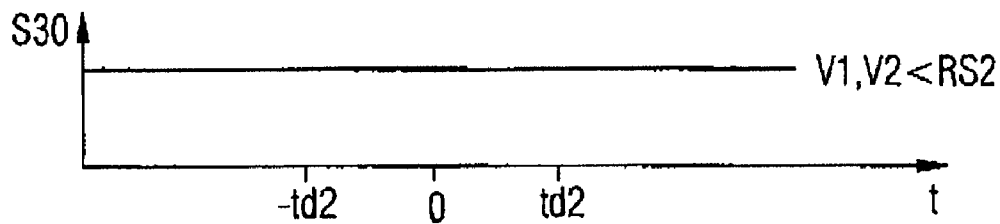
FIG. 13 illustrates the effects of the temporal pulse spacing of the two pulses on the reset signal (FIG. 13a) and the output signal (FIGS. 13b) for amplitudes of the signal pulses below the second detector threshold.
Figure 13B:
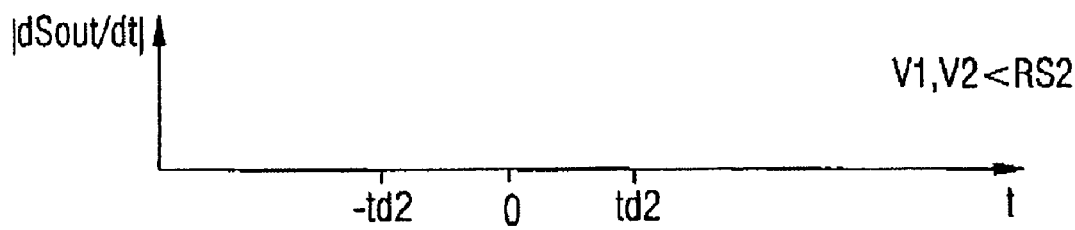

Signal pulses whose amplitudes V1, V2 are in each case less than the second detector threshold RS2, irrespective of their temporal spacing, cannot lead either to a generation of the reset signal S30 or to a change in the output signal, which is illustrated in FIG. 13.

LIST OF REFERENCE SYMBOLS

1 Transmitter arrangement
11, 12 Signal detectors
2, 3 Channels
21, 22 Signal detectors
30 Reset circuit
31, 32 Buffer stores
311, 321 Flip-flop
312, 322 Asymmetrical delay elements
314, 324 Logic gates (NAND gates)
33 OR gate
331 Flip-flop
332 NOR gate
333 Logic gate (AND gate)
4 Receiver arrangement
51, 52 Buffer stores
511, 521 Flip-flop
512, 522 Asymmetrical delay elements
514, 524 Logic gates
60 Combination circuit
C Capacitor
IN Input of a push-pull transmission arrangement
In1, IN2 Inputs of the receiver arrangement
Iq1, Iq2 Current sources
N1 Circuit node
OUT Output of a push-pull transmission arrangement
RS1, RS2 Detector thresholds
S Input signal
S11, S12 Detector output signals
S21, S22 Detector output signals
S30 Reset signal
S31, S32 Buffer store output signals
S31, S32 Buffer store output signals
S51, S52 Buffer store output signals
Sdel Delay signal Sin Input signal of a push-pull transmission arrangement
Sin1, Sin2 Input signals of the receiver arrangement
Sout Output signal of a push-pull transmission arrangement
Sout1, Sout2 Output signals of the transmitter arrangement
ST Inverting Schmitt trigger
td1, td2 Delay durations/storage durations
TP, TN Transistors
V1, V2 Signal amplitudes
Vc Capacitor voltage
Vh, Vl Switching thresholds of the inverting Schmitt trigger
$\Delta t12$ Temporal signal spacing

The invention claimed is:

1. A receiver circuit for a push-pull transmission method, comprising:
 a) a first input operable to receive a first input signal, a second input operable to receive a second input signal, and an output operable to provide an output signal based on the first input signal and the second input signal;
 b) a first signal detector connected to the first input and a second signal detector connected to the first input, the first signal detector operable to provide a first detector signal depending on a comparison of the first input signal with a first threshold, the second signal detector operable to provide a second detector signal depending on a comparison of the first input signal with a second threshold, wherein the first threshold is greater than the second threshold;
 c) a third signal detector connected to the second input and a fourth signal detector connected to the second input, the third signal detector operable to provide a third detector signal depending on a comparison of the second input signal with a third threshold, the fourth detector operable to provide a fourth detector signal depending on a comparison of the second input signal with a fourth threshold, wherein the third threshold is greater than the fourth threshold;
 d) a first buffer store including a first data input, a first reset input, and a first data store output, the first data input connected to the first signal detector, wherein the first buffer store is operable to receive the first detector signal at the first data input, receive the fourth detector signal at the first reset input, and buffer-store the third detector signal and forward it to the first data store output as a first data store output signal following a first delay duration;
 e) a second buffer store including a second data input, a second reset input, and a second data store output, the second data input connected to the third signal detector, wherein the second buffer store is operable to receive the third detector signal at the second data input, receive the second detector signal at the second reset input, and buffer-store the third detector signal and forward it to the second data store output as a second data store output signal following a second delay duration; and
 f) a combination circuit operable to generate the output signal depending on the first data store output signal and the second data store output signal.

2. The receiver circuit of claim 1 wherein the first threshold is equal to the third threshold and the second threshold is equal to the fourth threshold.

3. The receiver circuit of claim 1 wherein the first delay duration is equal to the second delay duration.

4. The receiver circuit of claim 1 further comprising a reset circuit operable to receive the second detector signal and the fourth detector signal and provide a reset signal to the first reset input of the first buffer store and the second reset input of the second buffer store, wherein the reset signal is dependent on a temporal spacing between a signal pulse of the second detector signal and a signal pulse of the fourth detector signal.

5. The receiver circuit of claim 4 wherein the reset circuit is operable to determine the temporal spacing between a predetermined edge of the second detector signal and a predetermined edge of the fourth detector signal.

6. The receiver circuit of claim 4 wherein the reset circuit comprises,
 a third buffer store operable to receive the second detector signal,
 a fourth buffer store operable to receive the fourth detector signal,
 a combination circuit operable to receive an output signal of the third buffer store and an output signal of the fourth buffer store and provide the reset signal.

7. The receiver circuit of claim 6 wherein the combination circuit comprises a storage element having a storage element data input, a storage element reset input and a storage element output, wherein a signal dependent on the output signal of the third buffer store and the output signal of the fourth buffer store is delivered to the storage element data input and a signal dependent on the second detector signal and the fourth detector signal is delivered to the reset input, and wherein the reset signal is available at the storage element output.

8. The receiver circuit of claim 7 wherein the storage element is a flip-flop.

9. The receiver circuit of claim 7 wherein the output signal of the third buffer store and the output signal of the fourth buffer store is a signal present at the storage element output.

10. The receiver circuit of claim 7 wherein the first data store output signal and the second data store output signal is a signal present at the output of the delay element.

11. The receiver circuit of claim 4 wherein the reset circuit is operable to reset the first buffer store and the second buffer store depending on the reset signal.

12. The receiver circuit of claim 1 wherein the first buffer store and the second buffer store each include a storage element having a storage element data input, a storage element reset input, and a storage element output, and wherein an asymmetrical delay element is connected downstream of the storage element output, the delay element operable to forward a first edge of a storage element output signal with a different delay time than a second edge of the storage element output signal.

13. A push-pull receiver circuit operable to receive a first input signal and a second input signal and produce an output signal, the receiver circuit comprising:
 a) means for comparing the first input signal to a first threshold;
 b) means for comparing the first input signal to a second threshold;
 c) means for comparing the second input signal to a third threshold;
 d) means for comparing the second input signal to a fourth threshold;
 e) first means for storing data if the first input signal is greater than the first threshold and for erasing stored data if the second input signal is greater than the fourth threshold;
 f) second means for storing data if the second input signal is greater than the third threshold and for erasing stored data if the first input signal is greater than the second threshold; and g) means for receiving data from the first means for storing data and the second means for storing data and generating the output signal depending on the data in the first means for storing data and the second means for storing data.

14. The push-pull receiver circuit of claim 13 wherein (i) the means for receiving data only receives data from the first means for storing data following a first delay duration after data is stored in the first means for storing data and (ii) the means for receiving data only receives data from the second means for storing data following a second delay duration after data is stored in the second means for storing data.

15. The push-pull receiver of claim 14 wherein the first delay duration is equal to the second delay duration.

16. The push-pull receiver circuit of claim 14 wherein the second means for storing data and erasing data only erases stored data if the determination that the first input signal is greater than the second threshold is received within a predetermined time duration before or after the determination that the second input signal is greater than the third threshold.

17. The push-pull receiver circuit of claim 13 wherein the first threshold is greater than the second threshold and the third threshold is greater than the fourth threshold.

18. The push-pull receiver circuit of claim 13 wherein the first threshold equals the third threshold and the second threshold equals the fourth threshold.

19. The push-pull receiver circuit of claim 13 wherein the first means for storing data and erasing data only erases stored data if the determination that the second input signal is greater than the fourth threshold is received within a predetermined time duration before or after the determination that the first input signal is greater than the first threshold.

20. A method of operating a push-pull receiver circuit operable to receive a first input signal and a second input signal and produce an output signal, the method comprising:
   a) comparing the first input signal to a first threshold;
   b) comparing the first input signal to a second threshold;
   c) comparing the second input signal to a third threshold;
   d) comparing the second input signal to a fourth threshold;
   e) storing a signal pulse of the first input signal in a first buffer store if the first input signal is greater than the first threshold;
   f) erasing the signal pulse stored in the first buffer store if the second input signal is greater than the fourth threshold;
   g) storing a signal pulse of the second input signal in a second buffer store if the second input signal is greater than the third threshold;
   h) erasing the signal pulse stored in the second buffer store if the first input signal is greater than the second threshold; and
   i) generating the output signal using (i) the signal pulse stored in the second buffer store for more than a first predetermined duration and (ii) the signal pulse stored in the second data store for more that a second predetermined duration.

* * * * *